Patented Sept. 19, 1950

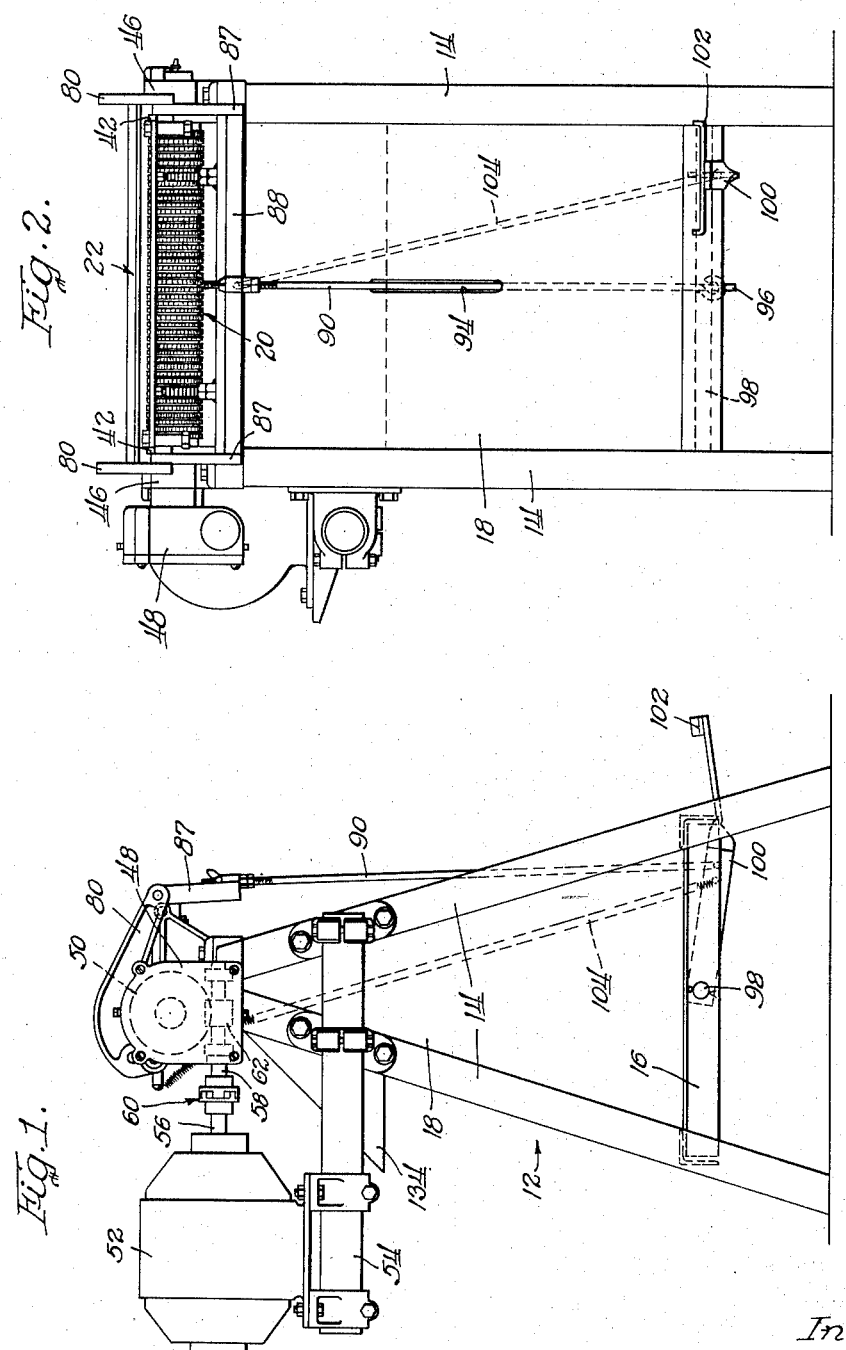

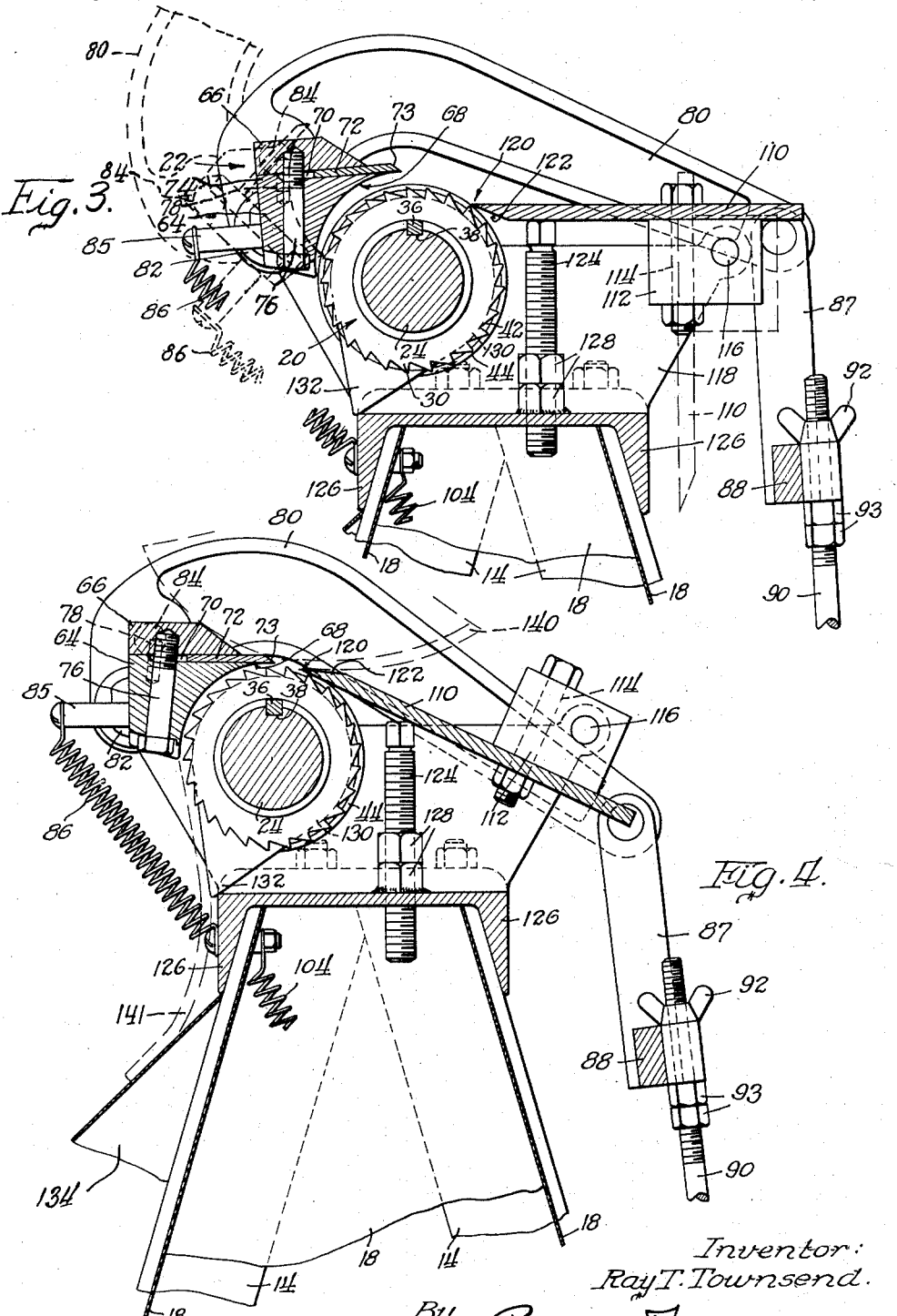

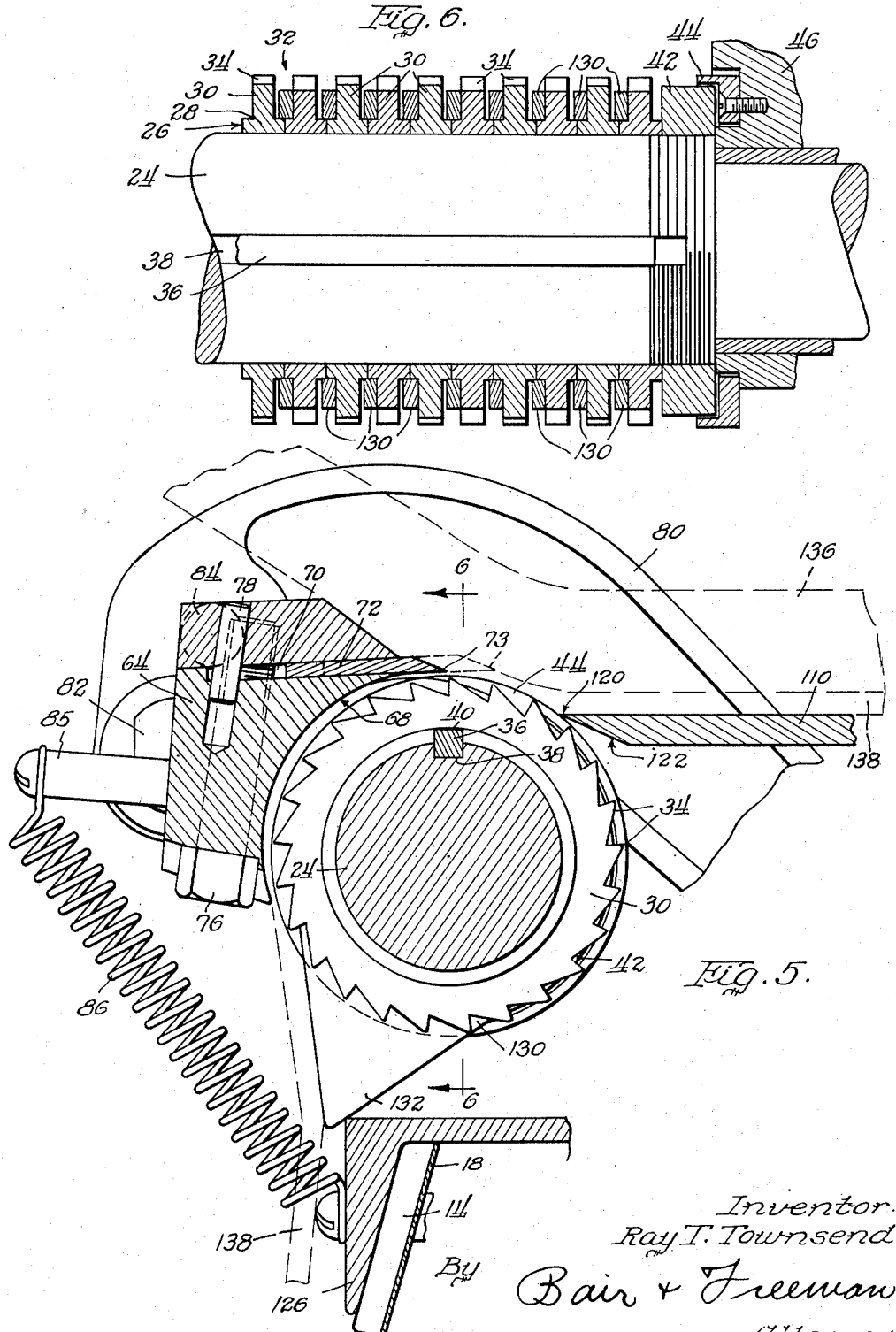

2,522,728

UNITED STATES PATENT OFFICE 2,522,728

SKINNING MACHINE

Ray T. Townsend, Des Moines, Iowa, assignor to Townsend Engineering Company, Des Moines, Iowa, a corporation of Iowa Application July 2, 1946, Serial No. 680,939

8 Claims. (Cl. 146—130)

This invention relates to skinning machines, and particularly machines for skinning hams, shoulders, backs, etc.

My present invention is an improvement over that disclosed in my previous application, Serial No. 562,460, filed November 8, 1944, and which became Patent Number 2,455,831 on December 7, 1948. A reissue for this patent Serial Number 67,442 was applied for on December 27, 1948, and matured into Reissue Patent 23,222 on April 25, 1950. This general type of machine involved, and disclosed in that application, includes an arrangement whereby a pressure shoe and a serrated roller cooperate to pull the skin from the piece to be skinned. The pressure shoe is provided with a skinning blade for separating the skin from the flesh. A table supports the piece to be skinned where it can be readily fed to the roller. The roller is formed with peripheral grooves, and stripping means fitted in the grooves strip the skin from the roller after it is drawn from the flesh.

An object of the present invention is the provision of an adjustable skinning blade. Adjustment of the skinning blade toward and away from the piece determines the amount of fat left on the skin.

Another object is the provision of a knife-edge on the skinning blade. In my previous application, above-mentioned, I have shown a blunt-edge skinning blade, and in many instances such a blade serves a good purpose. A blunt-edge blade divides the skin and flesh at the natural parting place; the skin and flesh of course are not integral, but are held together by fat, and sheer pulling force will separate them, leaving a certain amount of the fat on each. A blunt-edge skinning blade produces about the same kind of a result. However, it is often desirable to leave more or less fat on the skin for certain purposes—thus the knife-edge blade. The knife-edge can be made to cut into the fat toward the skin for removing as much of it as desired, and by that feature together with the adjustability of the blade, complete control can be had over the amount of fat removed from the skin.

An additional and important advantageous feature is that the skin need not be parted manually, such as by loosening one corner, for the skinning blade and roller to grip the skin. For instance, when skinning a round piece, the skin is slitted longitudinally, and by merely placing the piece with the slit next to the skinning blade, one side of the slit is caught between the pressure shoe and roller.

A further object is the provision of an invertible table for supporting the piece to be skinned. The table in one position is horizontal for supporting flat pieces. In another position the table slopes downwardly away from the roller and blade, so that round pieces, such as hams and shoulders, will tend to turn away from the skinning blade as the skin is being pulled off.

Another object of the invention is the provision of a new and improved type of stripping means for stripping the skin from the roller after it is pulled. Plates or rings entirely encircle the skinning roller and extend beyond the periphery of the roller at one point and are held against rotation by a bar or ledge. They can be easily removed and cleaned.

With these and other objects in view, my invention consists in the construction, arrangement and combination of the various parts of my device whereby the objects contemplated are attained, as hereinafter more fully set forth, pointed out in the claims and illustrated in the accompanying drawings, in which:

Fig. 1 is a side view of the skinning machine;

Fig. 2 is a front view of the machine;

Fig. 3 is a vertical sectional view of the upper part of the machine on an enlarged scale, and showing the pressure shoe out of engagement with the roller;

Fig. 4 is a view similar to Fig. 3, but with the pressure shoe in engagement with the roller, and with the supporting table inverted;

Fig. 5 is a view similar to Fig. 3 on an enlarged scale, and showing the pressure shoe in engagement with the roller; and Fig. 6 is a view taken substantially on line 6—6 of Fig. 5, showing the roller in section, and the supporting means therefor at one end.

Referring in detail to the drawings, the skinning machine of my invention comprises a frame or stand 12, having diagonal uprights 14, braced by cross pieces 16, and having an enclosing wall or shield 18.

The skin pulling means includes a roller 20, and a curved pressure shoe 22 cooperating with the roller, both of which extend across the machine. The roller 20 is made up of a shaft 24 and a plurality of rings 26 on the shaft. Each ring 26 is generally of a width of the main portion indicated at 28, and extending from the main portion 28 is a reduced portion 30. The reduced portion 30 forms grooves 32 therebetween, and on the periphery of the reduced portion 30 is a plurality of teeth or serrations 34. The rings 26 are held against rotation on the shaft by a key 36 fitted into keyways 38 and 40 in the shaft and rings, respectively. The rings 26 are held against axial displacement by a locking ring 42 on each end, which in turn are held by shields 44, one on each end. The shields 44 are secured to housings 46, and the housings 46 are mounted on the framework.

Referring to Fig. 2, a gear housing 48 is mounted at the left of the machine, and includes a gear 50 therein secured to the end of the shaft 24, which projects into the housing. A motor 52 is mounted on a support 54, which in turn is mounted on the frame. The drive shaft 56 of the motor is connected to another shaft 58, by means of a coupling 60. The shaft 58 is journaled in the gear housing 48, and is provided with a worm 62 for driving the gear 50 and the roller in counter-clockwise direction, as viewed in Figs. 1, 3, 4 and 5.

The pressure shoe 22 cooperates with the roller 20 for forming a skin pulling means. The pressure shoe 22 comprises a lower element 64, and an upper element 66. The lower element 64 is provided with a concave curved surface 68, which is adapted to engage the roller 20. On the upper surface of the lower element 64 and toward the forward side thereof is a recess 70 for the reception of a skinning blade 72 having a taper 73, forming a knife-edge. The upper element 66 is placed over the lower element 64 and engages a projection 74, which is at the rear of the upper surface of the lower element, and the skinning blade 72. The two elements 64 and 66 are secured together by a plurality of bolts 76 extending through openings in the lower element, and threaded in to the upper element. Guiding studs 78 are fixed in the under surface of the upper element 66 and fit into holes formed in the lower element for guiding the two elements together. By loosening the bolts 76, the skinning blade 72 can be adjusted outwardly and inwardly of the pressure shoe 22.

Means is provided for bringing the pressure shoe 22 into and out of engagement with the roller 20, comprising a pair of arms 80, one at each side of the machine, and pivoted at 82 on the frame. Formed on each end of the upper element 66 is a stud 84 forming trunnions, and which extend into openings in the arms 80 near the pivot point of the arms. The pressure shoe 22 is free to swing or pivot about these trunnions.

An arm 85 extends rearwardly from the lower part of the lower element 64 of the pressure shoe, and secured to the outer end of the arm 85 there is a tension spring 86 leading downwardly where it is secured to the frame of the machine.

At the forward end of the arms 80 is a yoke 87 having a cross bar 88. A treadle rod 90 is secured to the cross bar 88 by means of a wing nut 92 and locking nuts 93, and extends through opening 94 in the shield 18 into the interior at the bottom, where it is pivoted to an arm 96. The arm 96 is welded to a shaft 98, which is pivoted in the cross pieces 16. Also fixed to the shaft 98 is another arm 100 having a treadle 102 extending outwardly in front of the machine. A tension spring 104 is connected between the arm 100 and the upper part of the frame, biasing the treadle arm 100 upwardly.

The table for supporting the pieces to be skinned is shown at 110, where it is bolted to bearing blocks 112, by means of bolts 114. One such bearing blocks 112 is at each side of the machine, and is pivoted at 116 in frame members 118. From the bearing blocks 112, the table 110 extends forwardly into proximity with the roller 20, as indicated at 120. The forward edge of the table has a beveled surface 122.

Stripping plates 130, comprising rings are positioned one in each of the grooves 32 in the roller. These plates or rings encircle the roller, and each is provided with an extension 132 extending outwardly beyond the teeth 34 of the roller, and the extensions 132 are of such a length to reach cap element 126 on the upper part of the frame 12.

The stripping plates 130 are shown narrower than the grooves 32. However, it is desirable that they have merely a loose fit and not produce much drag on the roller. They may be just thick enough to fit easily into the grooves 32.

Adjusting screws 124 are threaded into cap element 126 forming the upper part of the frame 12. Lock nuts 128 are threaded on the adjusting screws 124 for locking the adjusting screws at any given adjustment. One such adjusting screw is placed at either side of the machine, and the table 110 rests thereon for adjusting the table at a given height.

A baffle 134 is welded to the upper rear side of the machine just below the cap 126 on the frame.

Use and operation

Fig. 3 shows the machine with the pressure shoe 22 out of engagement with the roller 20, where it can be seen that there is a space between the surface 68 of the pressure shoe and the roller. The piece to be skinned is placed on the table 110 with the skin down, and the edge is forced toward the skinning blade 72. Then the treadle 102 is depressed, which pulls the arms 80 down, and thus the pressure shoe 22 is brought into engagement with the roller. Rotation of the roller counter-clockwise cooperates with the curved surface 68 to pull the skin from the piece.

Fig. 5 shows a flat piece of meat 136 on the table, with the skin 138 shown being pulled between the roller and the pressure shoe. The body of the meat then passes over the pressure shoe. Here also (Fig. 5) is shown how the stripping plates 130 operate. The extensions 132 extend downwardly beyond the periphery of the roller, and the skin is deflected by them away from the roller and drops down. It is then further deflected by the baffle 134 into a receptacle. Upon releasing the treadle 102, the spring 104 biases the treadle upwardly and thereby biases the arms 80 upwardly also. This brings the pressure shoe 22 out of engagement with the roller.

In the position of the table 110 as shown in Figs. 3 and 5, the bevel surface 122 of the table permits placing the forward edge of the table closely adjacent the roller. This permits the piece of meat to be forced up on the roller, and to be started by that portion of the roller in the space between the forward edge of the table and the edge of the skinning blade 72.

The skinning blade 72 is disposed approximately tangential to the roller 20, when it is in operating position, as shown in Fig. 5. To adjust the skinning blade, the bolts 76 are loosened, the blade moved out or in, i. e., to the right or left, and the bolts tightened. When the blade is innermost (Fig. 5) and the pressure shoe is in operating position, the cutting edge of the blade is directly over the center of the roller. In this position there is the least space between the blade and the roller, and substantially all of the fat is removed from the skin. When the blade is adjusted outwardly to a more forward position, as shown in dotted lines in Fig. 5, it tends to cut into the flesh and leaves more fat on the skin.

In the usual operation of the machine, it is not necessary to lift the pressure shoe from the roller, because the roller grips or drags the meat into the skinning blade, the knife-edge of the skinning blade readily parting the skin from the meat. From that point on the skin is gripped securely between the roller and the pressure shoe, and pulled from the piece of meat.

For skinning round pieces, such as hams and shoulders, the table 110 is inverted to the position shown in Fig. 4. The bolts 114 are removed and the table 110 is then inverted and secured to the undersurface of the bearing blocks 112. This puts the rear surface of the table much lower, so that it slopes downwardly away from the roller. The adjusting screws are set at the proper vertical height to accommodate this new position of the table.

In the case of flat pieces, it is desirable to have the table 110 flat to rest the meat on it, and the meat is forced over the top of the pressure shoe. However, in the case of round pieces, they rest on a much smaller area, and in order for the round pieces to roll over as the skin is being pulled off, the table 110 is turned to its new position enabling the round pieces to roll back, or away from the skinning blade, as the skin is being drawn off. In Fig. 4 a round piece is indicated at 140, from which the skin 141 is drawn.

When round pieces are to be skinned, since the skin entirely encircles the piece, it is necessary to slit the skin longitudinally. It is not necessary to rip one side of the skin in order to get it started through the machine; it is only necessary to place the piece of meat with the slit adjacent the skinning blade 72, the roller dragging the meat toward the skinning blade, and the knife-edge 73 of the skinning blade works itself into the slit and begins to part the skin from the meat. Many round pieces are irregular, for example, shoulders, and in that case, there is usually a portion of the skin which does not entirely encircle the meat. This portion is started onto the skinning blade first, in order to start it more easily. By turning the piece of meat in the proper direction, the entire skin is pulled off, even though the shape is very irregular.

The shields 44 are of a diameter just slightly greater than the roller. The pressure shoe 22 comes into engagement with the shields 44 to prevent the pressure shoe from clashing with the teeth of the roller. However, this spacing is very slight and because of that, good gripping action is accomplished by the roller and the pressure shoe. The skin, after it has been pulled, may have indentations formed by the teeth of the roller, but these do not effect the utility of the skin in most cases.

The spring 86 biases the pressure shoe in a counter-clockwise direction, as viewed in Fig. 3, so that when the treadle 102 is released, the skinning blade 72 will be decisively raised from the roller.

The shields 44 also prevent the table 110 from clashing with the teeth. However, these shields ordinarily do not serve to space the table from the teeth, since the adjusting screws 124 serve that purpose.

For the purpose of ease in cleaning the machine, the wing nut 92 is removed from the treadle rod 90, releasing the yoke 88 from the treadle rod. The arms 80 can then be swung back to the dotted line position shown in Fig. 3. This movement carries the pressure shoe away from the roller and partially inverts it. Also, the table 110 can be swung clear of the roller to the dotted line position shown in Fig. 3. This leaves the roller clear for cleaning.

The shaft 24 can be removed and the rings 26 and stripping plates 130 removed from the shaft for cleaning them individually. This is important in machinery for working on meat, because obviously it must be kept clean.

While I have shown a particular embodiment of my invention, it will be understood of course that I do not wish to be limited thereto since many modifications may be made, and I therefore contemplate by the claims appended hereto to cover any such modifications or substitutions of mechanical equivalents as fall within the true spirit and scope of my invention.

I claim:

1. A machine for removing skin from an object, comprising a frame, a driven rotatable roller journalled in said frame, a pressure shoe movably mounted on said frame, said pressure shoe having a concave surface surrounding a substantial portion of said roller and closely spaced therefrom when said pressure shoe is in the position it assumes during the skinning operation, a skinning blade mounted on the leading edge of said pressure shoe, said object being adapted to be moved toward said leading edge to perform a skinning operation, said blade being disposed in a plane substantially tangent to said roller, said roller having a skin gripping surface thereon cooperating with said pressure shoe to pull said skin past said skinning blade, said skinning blade being adjustable in said pressure shoe in its plane of tangency to said roller to form a mouth with said roller, the angle of which is variable due to said adjustment of the skinning blade, said mouth facing toward said object and positioned ahead of the point of tangency between said skinning blade and said roller relative to the movement of said object, and means for urging said pressure shoe and said roller toward each other and affording movement of said pressure shoe and roller apart from each other to automatically vary the space therebetween to accommodate varying thicknesses of skin during the removal of the skin from said object.

2. A machine for removing skin from an object, comprising, a frame, a driven rotatable roller journalled in said frame, a pressure shoe movably mounted on said frame, said pressure shoe having a concave surface surrounding a substantial portion of said roller and closely spaced therefrom when said pressure shoe is in the position it assumes during the skinning operation, a skinning blade mounted on the leading edge of said pressure shoe, said object being adapted to be moved toward said leading edge to perform a skinning operation, said blade being disposed in a plane substantially tangent to said roller, said roller having a skin gripping surface thereon cooperating with said pressure shoe to pull said skin past said skinning blade, said skinning blade being adjustable in said pressure shoe in its plane of tangency to said roller to a position wherein the cutting edge of said skinning blade is disposed ahead the point of tangency between said skinning blade and said roller relative to the movement of said object, and means for urging said pressure shoe and said roller toward each other and affording movement of said pressure shoe and roller apart from each other to automatically vary the space therebetween to accommodate varying thicknesses of skin during the removal of the skin from said object.

3. A machine for removing skin from an object, comprising, a frame, a driven rotatable roller journalled in said frame, a pressure shoe movably mounted on said frame, said pressure shoe having a concave surface surrounding a substantial portion of said roller and closely spaced therefrom when said pressure shoe is in the position it assumes during the skinning operation, and a skinning blade mounted on the leading edge of said pressure shoe, said object being adapted to be moved toward said leading edge to perform a skinning operation, said blade being disposed in a plane substantially tangent to said roller, said roller having a skin gripping surface thereon cooperating with said pressure shoe to pull said skin past said skinning blade, said roller and pressure sleeve forming the sole skin pulling means, said skinning blade being adjustable in said pressure shoe in its plane of tangency to said roller to a position wherein the cutting edge of said skinning blade is disposed ahead the point of tangency between said skinning blade and said roller relative to the movement of said object.

4. A machine for removing skin from an object, comprising, a frame, a driven rotatable roller journalled in said frame, a pressure shoe movably mounted on said frame, said pressure shoe having a concave surface surrounding a substantial portion of said roller and closely spaced therefrom when said pressure shoe is in the position it assumes during the skinning operation, a skinning blade mounted on the leading edge of said pressure shoe, said object being adapted to be moved toward said leading edge to perform a skinning operation, said roller having a skin gripping surface thereon cooperating with said pressure shoe to pull said skin past said skinning blade, said skinning blade being adapted to form a mouth with said roller, said mouth facing toward said object and positioned ahead of the point of tangency between said skinning blade and said roller relative to the movement of said object, said skinning blade being adjustable in said pressure shoe so as to vary the angle of said mouth when the pressure shoe is in skinning position, and means for urging said pressure shoe and said roller toward each other and affording movement of said pressure shoe and roller apart from each other to automatically vary the space therebetween to accommodate varying thicknesses of skin during the removal of the skin from said object.

5. A machine for removing skin from an object, comprising, a frame, a driven rotatable roller journalled in said frame, a pressure shoe movably mounted on said frame, said pressure shoe having a concave surface surrounding a substantial portion of said roller and closely spaced therefrom when said pressure shoe is in the position it assumes during the skinning operation, a skinning blade mounted on the leading edge of said pressure shoe, said object being adapted to be moved toward said leading edge to perform a skinning operation, said blade being disposed in a plane substantially tangent to said roller, said roller having a skin gripping surface thereon cooperating with said pressure shoe to pull said skin past said skinning blade, said skinning blade being adjustable in said pressure shoe in its plane of tangency to said roller, to a position wherein the cutting edge of said skinning blade is positioned ahead of the point of tangency between said blade and said roller relative to the movement of said object, the adjustment of said blade being effective to vary the angle between said blade and that point on the roller nearest the cutting edge of the blade, and means for urging said pressure shoe and said roller toward each other and affording movement of said pressure shoe and roller apart from each other to automatically vary the space therebetween to accommodate varying thicknesses of skin during the removal of the skin from said object.

6. A machine for removing skin from an object, comprising, a frame, a driven rotatable roller journalled in said frame, a pressure shoe movably mounted on said frame, said pressure shoe having a concave surface surrounding a substantial portion of said roller and closely spaced therefrom when said pressure shoe is in the position it assumes during the skinning operation, a skinning blade mounted on the leading edge of said pressure shoe, said object being adapted to be moved toward said leading edge to perform a skinning operation, said blade being disposed in a plane substantially tangent to said roller, said roller having a skin gripping surface thereon cooperating with said pressure shoe to pull said skin past said skinning blade, said skinning blade being adjustable in said pressure shoe in its plane of tangency to said roller to a position wherein the cutting edge of said skinning blade is disposed adjacent the point of tangency between said skinning blade and said roller, and to a position wherein the cutting edge thereof is positioned ahead of said point of tangency relative to the movement of said objects, and means for urging said pressure shoe and said roller toward each other and affording movement of said pressure shoe and roller apart from each other to automatically vary the space therebetween to accommodate varying thicknesses of skin during the removal of the skin from said object.

7. In a skinning machine, a frame, a toothed driven roller mounted thereon, said roller having a plurality of axially spaced circumferential grooves therein, a concave pressure shoe, movable means for mounting said pressure shoe, said pressure shoe being pivotally mounted in said mounting means, said mounting means being operative for bodily moving said pressure shoe into and out of operative position with respect to said roller, means limiting the movement of said pressure shoe into operative position, said pressure shoe when in operative position surrounding a substantial portion of said roller, said pressure shoe having a reduced leading edge, said roller and pressure shoe cooperating to form a skin pulling means for pulling an object to be skinned against said reduced leading edge, means biasing said pressure shoe about its pivot axis in said mounting means in a direction to move said reduced leading edge away from said roller, the trailing edge of said pressure shoe being adapted to be in engagement with said limiting means when said reduced leading edge is moved away from said roller, stripping plates in said grooves and adapted to have free rotation therein, said stripping plates being, for the major portion thereof, of less radial dimension than said teeth, and having portions extending radially beyond said teeth, and stop means on said frame in close proximity to said teeth for preventing rotation of said stripping plates in one direction.

8. In a skinning machine, a frame, a toothed driven roller mounted thereon, movable means for mounting said pressure shoe, said pressure shoe being pivotally mounted in said mounting means, said mounting means being operative for bodily moving said pressure shoe into and out of operative position with respect to said roller, means limiting the movement of said pressure shoe into operative position, said pressure shoe when in operative position surrounding a substantial portion of said roller, said pressure shoe having a reduced leading edge, said roller and pressure shoe cooperating to form a skin pulling means for pulling an object to be skinned against said reduced leading edge, and means biasing said pressure shoe about its pivot axis in said mounting means in a direction to move said reduced leading edge away from said roller, the trailing edge of said pressure shoe being adapted to be in engagement with said limiting means when said reduced leading edge is moved away from said roller.

RAY T. TOWNSEND.

REFERENCES CITED

The following references are of record in the file of this patent:

UNITED STATES PATENTS

| Number | Name | Date |
| --- | --- | --- |
| 19,541 | Blanchard | Mar. 9, 1858 |
| 598,236 | Apgar | Feb. 1, 1898 |
| 940,830 | Spenko | Nov. 23, 1909 |
| 1,350,096 | Fisher | Aug. 17, 1920 |
| 1,376,810 | Hieatzman | May 3, 1921 |
| 1,703,217 | Watson | Feb. 26, 1929 |
| 1,847,536 | Pruefer | Mar. 1, 1932 |
| 1,852,187 | O'Connor | Apr. 5, 1932 |
| 1,975,044 | Kelly | Sept. 25, 1934 |
| 2,254,969 | Lindsey | Sept. 2, 1941 |
| 2,261,589 | Piper | Nov. 4, 1941 |
| 2,455,831 | Townsend | Dec. 7, 1948 |

FOREIGN PATENTS

| Number | Country | Date |
| --- | --- | --- |
| 611,911 | Germany | Apr. 12, 1935 |
| 14,677 | Great Britain | July 31, 1894 |